May 26, 1970    K. FORSCHLER    3,514,574
APPARATUS FOR MANUFACTURE OF RESISTANCE WELDED
ARTICLES, ESPECIALLY BIMETALLIC CONTACT RIVETS
Filed March 9, 1966    4 Sheets-Sheet 2

INVENTOR.
KURT FORSCHLER
BY
Dresler, Goldsmith, Clement & Gordon
ATTORNEYS

United States Patent Office 3,514,574
Patented May 26, 1970

---

3,514,574
APPARATUS FOR MANUFACTURE OF RESISTANCE WELDED ARTICLES, ESPECIALLY BIMETALLIC CONTACT RIVETS
Kurt Forschler, Birkenfeld, Germany, assignor to Fansteel Inc., a corporation of New York
Filed Mar. 9, 1966, Ser. No. 533,060
Claims priority, application Germany, Mar. 10, 1965, 1,540,749
Int. Cl. B23k *11/02*
U.S. Cl. 219—103      11 Claims

ABSTRACT OF THE DISCLOSURE

Apparatus for forming headed articles and in particular bi-metallic contacts in which two axially aligned wires of differing materials are abutted and welded together. A bi-metallic peg is cut from the welded wires by simultaneously shearing the wires, the peg being transversely shifted by one of the cutter members into alignment with a forming tool disposed adjacent to and having an axis parallel to the wires in which tool the desired headed element is formed.

---

This invention relates to apparatus for the manufacture of resistance-welded parts and, in particular, to apparatus for the production of bi-metal contacts directly from wire.

Present devices for the production of such parts usually include a turnable provided with a plurality of equally spaced lower dies which correspond in size to the diameter of wire to be shaped into the contact. One or more wire-feed mechanisms, welding devices and forming or coining tools are positioned above the turntable at successive stations through which each bottom die passes as the turntable is indexed. In a typical cycle of operation, a first wire is fed into the bottom die at a first station and is severed as the turntable indexes. A second wire is fed into the bottom die and is welded to the first wire stub at the next station. The second wire is also severed as the turntable continues to index, and the welded two-wire, or bi-metal, stub is then formed in subsequent coining or shaping operations at additional stations as the turntable continues to index.

One problem inherent in this type of operation is the high localized temperatures to which the lower dies are subjected, the consequent stresses and burning or erosion of the dies arising from the fact that welding occurs inside the lower dies. In order to avoid this problem, modifications have been suggested in which the welding occurs above the bottom die in a special welding unit or in the feed mechanisms supplying the second wire. This allows the welding to occur outside the bottom die. In this type embodiment, the first wire is fed into the bottom die and again severed as the turntable indexes. This wire stub is then partially ejected from bottom die so that the second wire, which may be fed down from above the die by a second wire-feed mechanism, may be welded to it outside the bottom die. The second wire is also severed as the turntable continues to index thereby forming the bi-metallic wire peg. In succeeding stations the wire peg may then be shaped as desired to produce bi-metallic contacts.

These apparatus are complicated and contain a large number of moving parts and require well-trained or special operators. Difficulties resulting from the number of moving parts limit the potential output of such apparatus, and, in addition, the life of these various parts is reduced since, with the utilization of a rotary turntable, a certain amount of play exists between the bottom dies located in the turntable and the tools or devices disposed above the turntable.

Contacts produced in such apparatus often are irregular and incorrectly aligned. Even when it is possible to machine the bottom dies to close tolerances and position them accurately in the turntable, the play between the turntable and the tools disposed above it, which is not readily avoidable, inherently limits the uniformity of the contacts produced.

The high-tolerance machining required of the dies used with such apparatus, of course, increases the cost of such devices. The production capabilities of turntable-type apparatus is also limited by the mass of the turntable, which must be constructed not only to carry all the bottom dies for the individual stations, but which must be able to withstand the various stresses and strains that occur during severing, welding and forming operations. In addition, since the bottom dies are used, in part, to sever the wire, the life of these dies, which must be maintained at close tolerance, is greatly reduced.

One alternative that has been suggested in attempts to reduce the complexity of the apparatus is the utilization of different machines to undertaken the individual steps. These machines would be connected by suitable conveying mechanisms. In accordance with one suggestion, the two wires would be severed to desired lengths in a first device which might be a turntable operating as described above, the wire stub would be welded together outside this machine and then conveyed in a suitable manner to another apparatus, which also might be a turntable-type device, for final forming and shaping. In this way, it would be possible to reduce the complexity of the individual machinery. The additional conveying requirements, however, introduce other troubles and maintenance problems. Furthermore, the production rate of such apparatus is not perceptively greater than the single, more complicated device.

An apparatus, in accordance with the present invention, is of a simple design with simple parts, is easy to service and to operate, provides long tool life and produces uniform parts at high production rates.

In such an apparatus, two wires, which may be of different metals, are brought together by periodically movable wire-feed mechanisms. The wires are welded together, are sheared off to form a bi-metallic peg which is then formed into a desired shape. This may be accomplished by locating two separate wire-feed mechanisms, which may conveniently be mounted on a common base, opposite to each other in axial alignment. One or more primary cutter blades and two secondary cutter blades are disposed on opposite sides of the wires supplied by the feed mechanisms and move at right angles to the common axis of the wires to sever the bi-metallic peg therefrom. One cutter blade may also be provided with a clamp to support the severed bi-metal peg. A forming tool, also located on the base plate, is disposed adjacent to the axis of the wire-supply mechanisms.

The operation of the entire apparatus may be synchronized by one central control mechanism. Thus, the wire-feed mechanisms converge until the ends of the wires carried by each are brought into contact; the wires are then welded together and the wire-feed mechanisms retracted from the welded joint; the primary and secondary complementary cutter blades then converge at right angles to the axis of the welded wire to sever the wire on either side of the welded joint to form a bi-metallic peg; and one blade continues at a direction transverse to the axis of the wire and carries the bi-metallic peg, which is supported in the peg clamp, to the forming tool where it is formed into its final shape.

The bottom die of the forming tool, the part which is subjected to heavy wear and tear, is fixed to the base of the apparatus. This reduces the possibility of the forming punch being misaligned with the die, a danger inherent as a result of the play between turntables and forming tools, and results in contacts being formed with greater uniformity and homogeneity. Since the forming tool is separated from the welding device, its useful life is extended since it is not subjected to the stresses of localized high temperatures that occur during welding.

The life of the forming tool is also extended by not utilizing it for any other function. As noted above, it is only the cutter blades that shear off the wire peg and no forming tools, welding devices or feeding mechanisms are used for this double function. These blades are easily replaceable and may be easily re-sharpened, particularly in comparison to the previously required re-grinding of the bottom dies in turntables.

Another feature of the present invention is the fact that the welding electrodes may be built into the wire-feed mechanisms. These large electrodes, which are connected to the wires to be welded, allow for adequate dissipation of heat generated during the welding, and, therefore, are not worn away or eroded as quickly as existing devices. The electrodes may be connected to the wires at a point quite close to their ends, thereby reducing the voltage loss due to heat dissipation in the wire. Furthermore, the welding itself occurs outside the electrodes, thereby reducing the erosion resulting from the high temperatures produced at the point of weld.

The configuration of the wire-feed mechanisms also allows for installation of an elastic member in one of the mechanisms. The elastic member is designed to insure that the ends of the wires are pressed together with a constant reproducible force during welding. To accomplish this, the wires are brought together in two steps. First, the wire-feed mechanisms converge until the end of the wires make contact. Secondly, the elastic member is released and forces the end of one wire against the other with a preselected constant force. The wires may then be welded to each other in the usual manner.

The respective feed mechanisms also may be adjusted so that different lengths of wire may be supplied by each. This ability to control the amount of wire feed permits adjustment, for example, for the relative conductivity of various materials to be welded to each other thereby providing proper voltage drop across the respective wires. As a result, the quality of the welding at the joint is consistent and of high quality.

After welding, the wire is severed to form the bimetallic peg. Only one of the cutter blades which converge transversely to the axis of the wire to shear off the peg is utilized as a transport means, the other blades returning to their original position. The transport blade, which is equipped with a peg clamp to hold the wire peg after it is severed, continues its movement to transport the bimetallic peg into the shaping tool.

A suitable peg clamp at the end of the cutter blade may be formed with a spring-biased member having a tapered surface exposed to the wire and a complementary surface facing the blade. The clamp automatically grasps the peg as the blade severs the wire and retains it therein during the transport motion. This resilient-type clamp automatically releases the peg after it is inserted into the forming tool. The reliability of such a clamp is increased by shaping the primary and secondary blades with arcuate cutting surfaces which match the diameter of the wire. In this way, the wire is sheared neatly and guided reliably into the peg clamp.

In an alternative embodiment, the peg, which is held in the peg clamp, is fed into a magazine rather than directly into the forming tool. In such a magazine, a hook resiliently rests on the peg and engages the peg clamp causing it to tilt upwardly and release the peg as the cutter blade is withdrawn. By utilizing a magazine between the feed-shear-weld station and the forming station, it is possible to locate the forming tool in almost any desired position with respect to the shear-weld station. The magazine may be adjusted as desired to coincide with the path of the cutter blade.

An apparatus designed in accordance with the present invention eliminates rotary turntables and resulting inaccuracy of parts produced thereby. Furthermore, the welding and cutting of the wire into a bi-metallic peg may occur at a single station distinct from the multiple stations utilized in turntable-type devices. Since the only remaining operation after severing is the forming of the peg into an appropriate shape, such as a contact, a single transfer step, from the feed-shear-weld station to the forming station, is sufficient. As set forth above, this may be accomplished by a single cutter blade after it severs the bi-metallic peg from the respective wires.

This simplified apparatus has improved production capabilities since it eliminates a plurality of stations and transfer steps. Thus, there is no longer one station for shearing the first wire, another station for shearing the other wire, a welding station, a forming station and an ejection station. The use of a cutter blade to transfer the peg instead of a turntable also allows for increased speed of operation. Since the cutter blade is used only for severing and for transporting, and is not designed to carry bottom dies or to withstand the various stresses and strains imposed on the turntables, it is substantially smaller and lighter than such turntables. Thus, the blades can accelerate faster, move quickly and stop rapidly, thereby eliminating a substantial period of idling time during the transfer of pegs from the welding station to the forming station.

The apparatus of the present invention is assembled to allow easy access to its relatively few parts, all of which are rather easily operated, and may be oriented at any desired angle to the horizontal. Furthermore, the apparatus of the present invention is more easily constructed as it is not equipped with a plurality of parts which have to fit each other as is the case in turntable type devices. Because the elements which are subjected to the greatest stresses and strains are stationary, the life of these parts has been extended beyond what is possible in existing devices.

Inadvertent shifting of the tools with respect to each other does not occur because the tools are fixed to the stationary base plate. This eliminates a substantial amount of maintenance which is now primarily limited to re-grinding or re-sharpening of the cutter blades. Each cutter blade may be easily adjusted individually to insure that the knives make contact with the wire simultaneously.

Numerous other advantages and features of the present invention will become readily apparent from the following detailed description of the invention and one embodiment thereof, from the claims, and from the accompanying drawings in which each and every detail shown is fully and completely disclosed as part of the specification, in which like reference numerals refer to like parts, and which:

Figure 1:
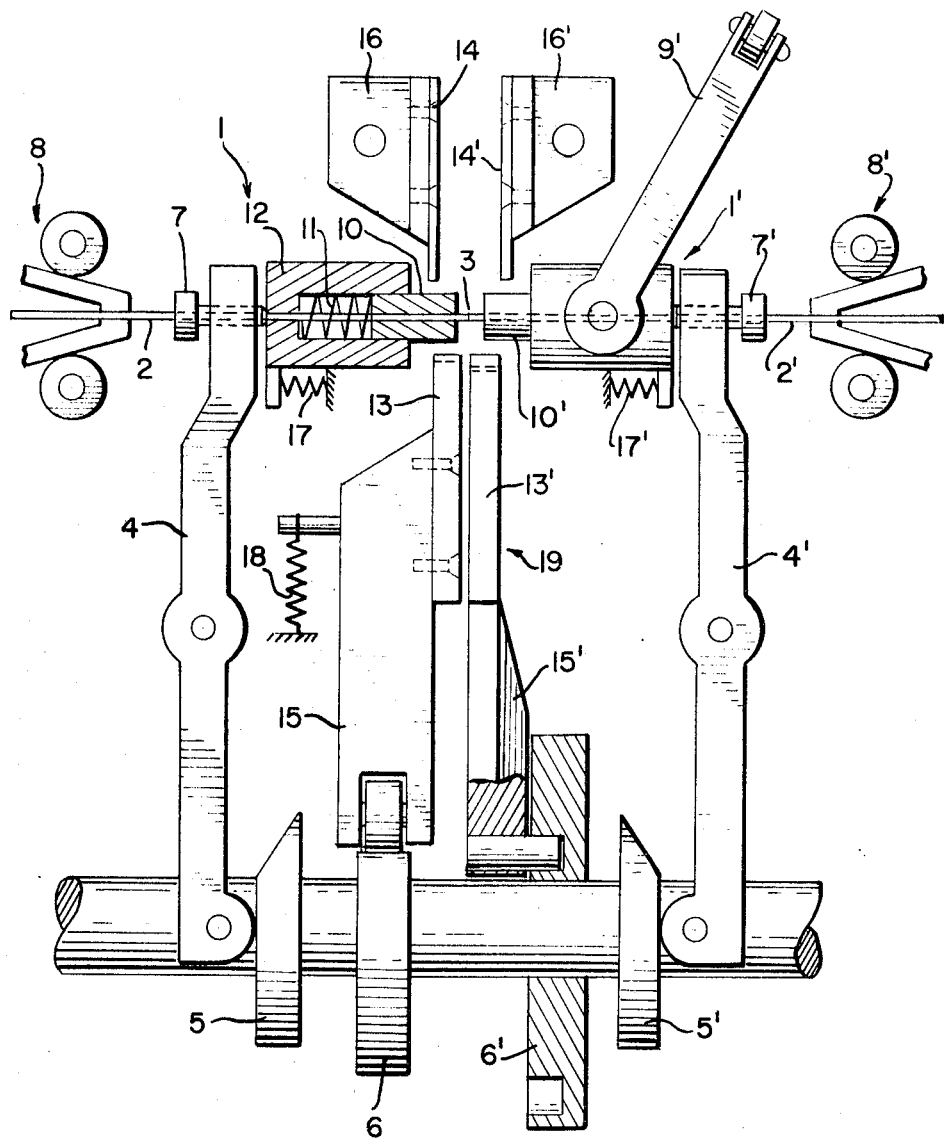
FIG. 1 is a diagrammatic view of the apparatus showing the wire-feed mechanisms and the complementary cutter blades in position for welding the wires.
Figure 2:
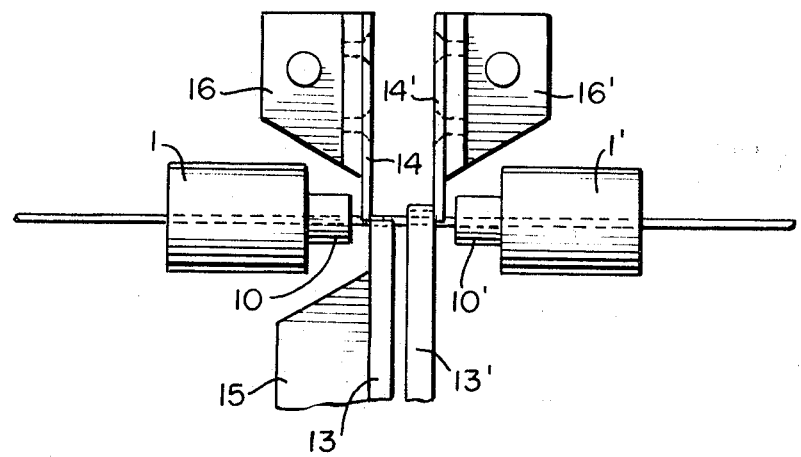
FIG. 2 is a partial view of FIG. 1 showing the wire-feed mechanisms withdrawn and the cutter blades in position to sever the wire.
Figure 3:
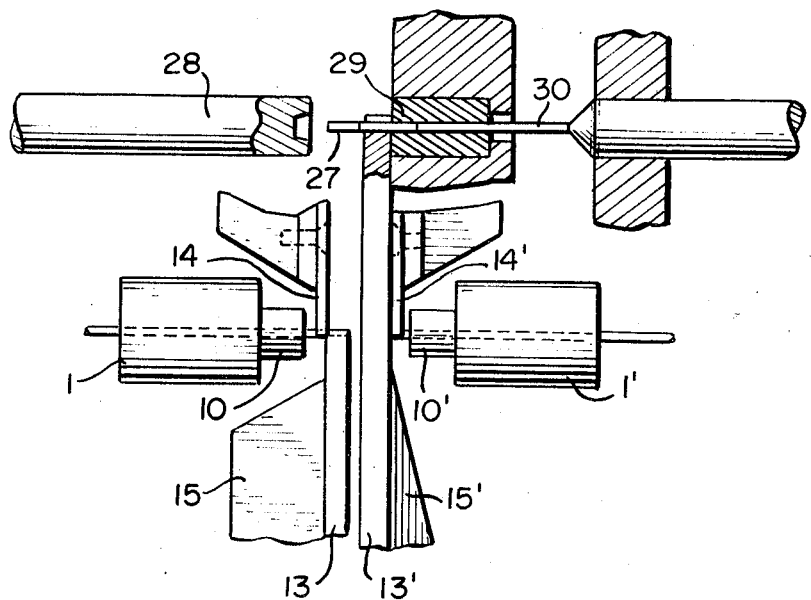
FIG. 3 is a diagrammatic view showing the arrangement of the wire-supply units and cutter blades with respect to the forming tool after the primary cutter blade has completed its transport motion.

Referring primarily to FIGS. 1, 2, and 3, two wire-feed mechanisms 1, 1' are arranged on a common base to allow for reciprocal operation. The wire-feed mechanisms 1, 1' accommodate the wires 2, 2', respectively, which may be of different metals. When the wire-feed mechanisms converge, they carry the wires together until the ends of the respective wires 2, 2' meet at a point 3.

The wire-feed mechanisms 1, 1' are controlled by one end pivotally mounted cam followers 4, 4', respectively. The other ends of the cam followers 4, 4' ride on cams 5, 5' which rotate on a main control shaft. Eccentrics 6, 6' which control the operation of the cutter blades also rotate on the control shaft.

Set screws 7, 7' adjust the amount of wire 2, 2', respectively, which is supplied by the respective wire-feed mechanisms. When the wire-feed mechanisms 1, 1' retract under control of cams 5, 5' and cam followers 4, 4', the wires 2, 2' are kept in place by wire brakes 8, 8' which allow a motion of the wire in one direction only.

The jaws of the wire-feed mechanisms 1, 1' are compressed as the feed mechanisms converge by control levers 9, 9' (control mechanisms 9 begin omitted for clarity). As the wire-feed mechanisms retract, the control levers 9, 9' cause the wire-feed mechanisms to release their grip on the wire.

The jaws 10, 10' of the wire-feed mechanisms 1, 1' consist of an electrode material which is a good conductor and which can withstand wear and tear. The movable jaw 10, shown in section, of wire-feed mechanism 1 is positioned inside a sleeve 12 to allow for longitudinal shifting against an elastic member 11.

Primary cutter blades 13, 13' and secondary blades 14, 14' are disposed on the same base plate and transversely to the common axis of wire-feed mechanisms 1, 1'. The cutter blades are arranged to sever the wire at a selected distance from the welded joint 3 (see FIG. 2). The primary blades 13, 13' and secondary blades 14, 14' are detachably mounted on support members 15, 15', 16, and 16', respectively, so they can be easily adjusted.

The support members 15, 15' are controlled by the eccentrics 6, 6'. Support members 16, 16' are controlled by similar eccentrics omitted for the sake of clarity. Springs 17, 17' and 18 bias the cam followers 4, 4' and the support member 15 against the cam and eccentric 5, 5' and 6, respectively. The control levers 9, 9' may be operated by similar cams and cam followers connected to the control shaft.

Figure 4:
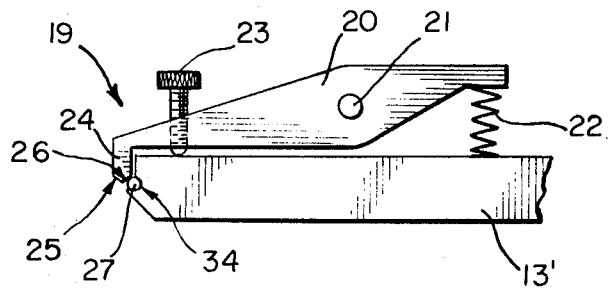
FIG. 4 is a side view of a typical peg clamp used with the primary cutter blade.

Referring now to FIG. 4, a peg clamp 19 is provided on the primary cutter blade 13'. The peg clamp 19 consists of a lever 20 pivotally supported at 21 and biased closed by a spring 22. An adjusting screw 23 allows for adjustment of the lever 20 to accommodate wire diameters.

The lever 20 is provided with a jaw 24 which goes around the blade of cutter blade 13'. The jaw has a tapered surface 25 which faces outwardly and a wire holding surface 26 which is tapered and faces the blade of cutter 13'. As the cutter blade approaches the wire, peg 27 cams the jaw open and enters the clamp between the edge of cutter 13 and the supporting surface 26 of lever 20 immediately prior to being severed from the wire.

Figure 5:
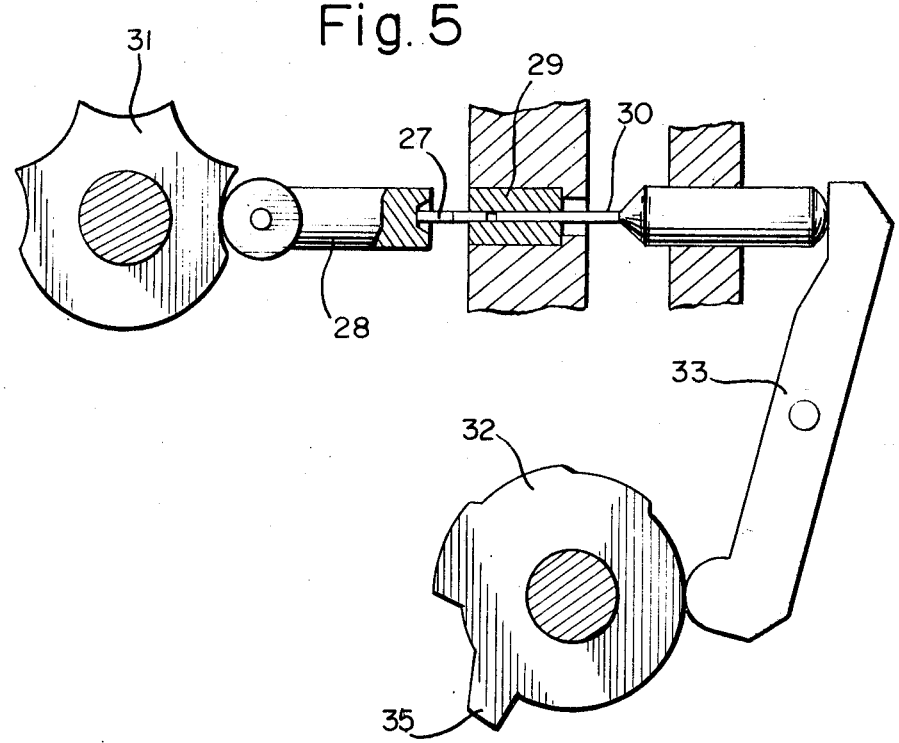
FIG. 5 is a more detailed diagrammatic view, partially in section, of the forming tool and its control mechanism.

Referring now to FIG. 3, it is seen that the cutter blade 13', continues its cutting motion as a transfer motion and introduces the bi-metallic peg 27 into the forming tool. The forming tool consists of an anvil 28, a bottom die 29 and a needle and guide 30 in addition to control mechanism, a start eccentric 31 and a step eccentric 32 (see FIG. 5).

Figure 6A:
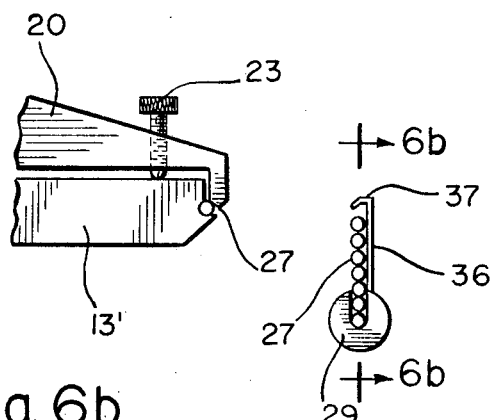
FIGS. 6a and 6b disclose an alternative embodiment wherein a magazine is utilized to receive the wire pegs.
Figure 6B:
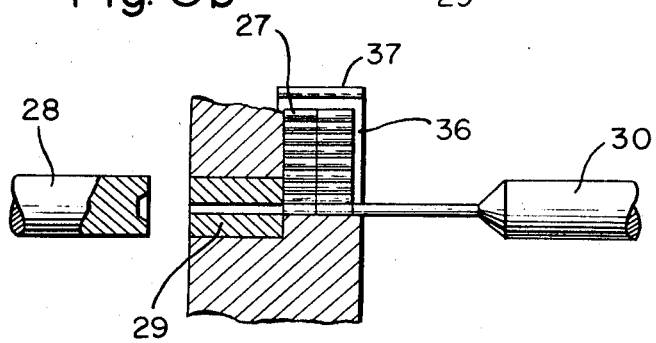

In FIGS. 6a and 6b an alternate embodiment is disclosed wherein the cutter blade 13' introduces the bi-metallic peg 27 into magazine 36. Upon introduction of the peg 27 into the magazine 36, a resilient hook 37 provided with a lug extending beyond the peg prevents it from following the withdrawal motion of the cutter blade 13'. The free metallic peg then slides downwardly in the magazine and becomes inserted into the channel designed for needle 30 from where it is moved into the bottom die 29. The magazine 36 may, of course, be arranged in other positions or may be tilted, thereby allowing the forming tool to be oriented independently of the position of the wire feed-shear-weld station.

In operation, the wire-feed mechanisms 1, 1' are converged toward each other from the position shown in FIG. 2 to the position shown in FIG. 1 under the influence of cams 5, 5' acting on cam followers 4, 4'. As this occurs, the supporting devices 9, 9' press upon movable jaws 10, 10' of the wire-feed mechanisms 1, 1' to lock the wires 2, 2' within the feed mechanisms. As a result, the wires 2, 2' are moved against each other at a point 3. By adjusting the set screws 7, 7' the amount of wire supplied can be controlled so that the point 3 where the wires make contact may be adjusted closer to one or the other of the wire-feed mechanisms.

At this point, the device 9 (which is not shown) is loosened so that the elastic member 11 may be released to push movable jaws 10 in the direction of wire-feed mechanism 1'. In this way, ends of wires 2, 2' will meet each other at a point 3 under a constant pressure.

Simultaneously, welding is initiated as is known in the art, and current is fed through jaws 10, 10' which are shaped as electrodes and across wires 2, 2'. The wires are welded by resistance welding at the joint 3.

Because the intensity of the welding is determined by the current, time and pressure, it is possible to obtain consistent results since it is possible to control current and time at a console and pressure by means of elastic member 11. In this way, the welding of wires 2, 2' is consistent time after time.

In addition, a constant voltage drop between the ends of the wires 2, 2' and the electrodes 10, 10' may be obtained by adjusting set screws 7, 7' as described above. In this way, it is possible to account for the various conductivities of the individual wires 2, 2' and the voltage drop across each segment of each wire can be controlled.

After welding, the wire-fed mechanisms 1, 1' are retracted under the action of the cams 5, 5' and cam followers 4, 4'. The primary cutter blades 13, 13' and secondary blades 14, 14' converge toward each other at right angles to the wires. As this occurs the wires 2, 2' will be inserted into the recesses 34 (see FIG. 4) of the knives 13, 13', 14 and 14', respectively, and are cleanly severed as the primary blades 13, 13' continue to advance.

In addition, as the cutter blade 13' approaches the wire, the front surface 25 of the jaw 24 hits the wire to cam the lever 20 open to allow the wire to enter the recess 34 of cutter blade 13'. The wire is retained in the recess 34 of cutter blade 13' by surface 26 of the jaw 24 after the peg 27 is severed from the wire.

Cutter blade 13' continues its motion, whereas the cutter blade 13 and secondary blades 14, 14' return to their starting positions. The bi-metallic peg 27, clamped in the peg clamp 19 is carried by the cutter blade 13' until it is aligned with bottom die 29. At this point, anvil 28 is driven by eccentric 31 against the peg 27 and partially inserts it into the bottom die 29.

The cutter blade 13' is then withdrawn by eccentric 6'. The peg 27 held in bottom die 29 cams open the lever 20 which releases the bi-metallic peg. As the anvil 28 moves toward bottom die 29, cam 32 drives needle 30 through cam follower 33 (see FIG. 5) into the bottom die 29. Continued action of the cams 31, 32, respectively, drives anvil 28 and needle 30 toward each other to form the peg 27 into the desired shape. The needle 30 and anvil 28 cooperate with each other so that the peg 27 is driven more and more out of the bottom die 29 and into the anvil 28 to assume a shape of the recess in the anvil 28.

After termination of the forming step, the formed contact is ejected in its finished shape. While the peg 27 is being formed into a contact, another feeding and welding operation has taken place, and the knives at the time of the ejection of the formed rivet are located approximately in the position shown in FIG. 2 ready to sever the succeeding peg from the wire and feed it to the forming tool.

Since the only large transfer motion is accomplished by the primary cutter 13', transporting the bi-metallic peg 27 to the forming tool, and because this knife has a relatively small mass, the output capacity of the apparatus is dependent upon the stability of the tools and upon the strength of the material to be formed. Furthermore, since the manufacturing, operating and maintenance costs of such apparatus, in accordance with the present invention, are low and because the useful life of the tools is substantially greater and because replacement of the tools is accomplished with minimum of trouble and requires only a simple adjusting procedure, it is possible to produce bi-metal welded contacts from wire with this apparatus in a most economical manner.

It will be readily observed from the foregoing detailed description and the illustrated embodiments thereof that numerous variations and modifications may be effected without departing from the true spirit and scope of the novel concepts and principals of this invention.

What is claimed is:

1. Apparatus for producing shaped and welded articles comprising in combination axially aligned wire feed mechanisms for supplying wires into end abutting relationship and affixed to a base, means for welding the wires together, cutter means disposed adjacent the wires, control means for advancing said cutter means towards the wires to simultaneously sever said wires and form a wire peg therefrom, clamp means associated with one of said cutter means for supporting the wire peg, forming means disposed adjacent said wire feed mechanisms and affixed to a base, said control means operable to advance said one cutter means to position the peg in said forming means, and to retract said one cutter means as the peg is inserted into said forming means, and means for driving said forming means to shape said peg into a selected configuration.

2. Apparatus in accordance with claim 1 in which said cutter means include a plurality of blade means disposed on opposite sides of said wires and movable transversely to the axis thereof, and in which said control means advances said cutter means towards the wires simultaneously.

3. Apparatus in accordance with claim 1 in which said forming tool and said wire feed mechanisms are fixed to a common base and have their axes parallel to each other.

4. Apparatus in accordance with claim 1 in which there are two wire feed mechanisms each supplying a wire composed of different metal, said cutter means severing a bi-metallic peg.

5. Apparatus in accordance with claim 4 in which each wire feed mechanism is provided with means for varying the amount of wire supplied thereby.

6. Apparatus in accordance with claim 1 in which one of said wire feed mechanisms is provided with an elastic member, said member operable when said wires are in end abutting relationship to force one wire against the other wire at constant pressuer.

7. Apparatus in accordance with claim 1 in which said peg clamp comprises a lever pivotally attached to said one cutter means provided with a jaw extending around the blade of said cutter means, said jaw being provided with an outwardly facing tapered surface adapted to be engaged by wire and an inwardly tapered surface facing the blade of the cutter means, said lever being resiliently biased for holding the wire peg in place between the inwardly tapered jaw surface and said blade surface.

8. Apparatus for manufacturing bi-metallic welded contacts directly from wire comprising in combination a pair of wire feed mechanisms reciprocably mounted in axial alignment on a common base, control means for advancing said wire feed mechanisms one toward the other until the wires carried by each meet in end abutting relationship, means associated with one of said wire feed mechanisms for forcing the end of one of the wires against the end of the other wire to achieve a selected pressure, said wire feed mechanisms including welding electrodes, means for applying a current to wire electrodes to effect resistance welding of the two wires, a plurality of complementary cutter blades disposed on opposite sides of said wire, said control means also operable for retracting said wire feed mechanisms and for simultaneously advancing said cutter blades towards the wire at right angles to the axis thereof to simultaneously sever both ends of a bi-metallic peg from the wire, a peg clamp attached to one of said cutter blades for automatically grasping the peg severed from the wire, and a forming tool disposed adjacent said wire feed mechanisms and fixed to the common base, said control means further operable to advance said one cutter blade until the peg is in position in said forming tool, whereby the peg is shaped by said forming tool into a bi-metallic contact.

9. Apparatus in accordance with claim 8 in which said forming tool comprises an anvil member, a bottom die and a needle, means for advancing said anvil against the peg to insert the peg into said die, and means cooperatively advancing said anvil towards said die and said needle into said die for forming the peg in accordance with the configuration of said anvil.

10. Apparatus in accordance with claim 8 in which said one cutter blade is retracted as the peg is inserted into said die and said peg clamp automatically releases the peg.

11. Apparatus in accordance with claim 7 in which said forming means includes, a magazine provided with a resilient lug for supplying pegs to said forming tool and in which said advancing cutter blade introduces said peg into said magazine until engaged by said lug, whereby the peg is automatically released by said peg clamp as said cutter blade is withdrawn from said magazine.

References Cited

UNITED STATES PATENTS

| 1,309,523 | 7/1919 | Hosford | 219—150 |
| 2,874,262 | 2/1959 | Otto | 219—57 |
| 3,279,505 | 10/1966 | Renz et al. | 219—57 |
| 3,299,246 | 1/1967 | Wahl | 219—103 |

JOSEPH U. TRUHE, Primary Examiner

L. A. SCHUTZMAN, Assistant Examiner

U.S. Cl. X.R.

219—57, 78, 104, 154